United States Patent [19]

Hall

[11] 4,098,017
[45] Jul. 4, 1978

[54] WATER FLOW THROUGH FISHING LURE

[76] Inventor: Joe Patrick Hall, P.O. Box 505, Branson, Mo. 65616

[21] Appl. No.: 751,705

[22] Filed: Dec. 17, 1976

[51] Int. Cl.² .................................................. A01K 85/00
[52] U.S. Cl. .................................. 43/42.06; 43/42.31; 43/42.35; 43/42.39
[58] Field of Search ................. 43/42.06, 42.35, 42.31, 43/42.39

[56] References Cited

U.S. PATENT DOCUMENTS

| | | | |
|---|---|---|---|
| 3,305,964 | 2/1967 | Wieszeck | 43/42.06 X |
| 3,449,852 | 6/1969 | Mitchell | 43/42.06 |
| 3,453,768 | 7/1969 | Feaster et al. | 43/42.06 |
| 3,744,174 | 7/1973 | Lund | 43/42.06 |

*Primary Examiner*—Hugh R. Chamblee
*Attorney, Agent, or Firm*—Thomas M. Scofield

[57] ABSTRACT

A noise - making fishing lure having an elongate body with openings provided therethrough for the flow of water and chambers provided in the body for containing air and weight elements.

10 Claims, 7 Drawing Figures

U.S. Patent  July 4, 1978  4,098,017
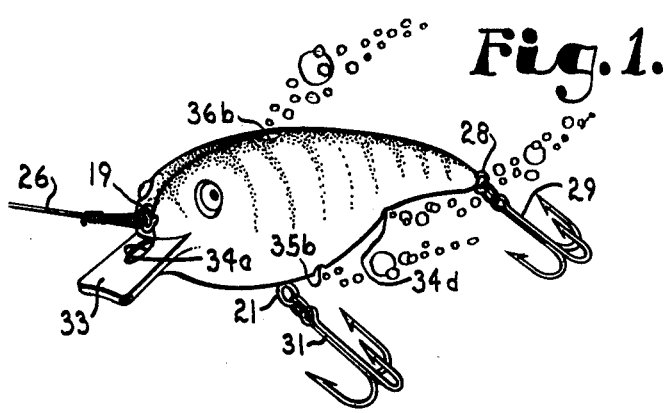
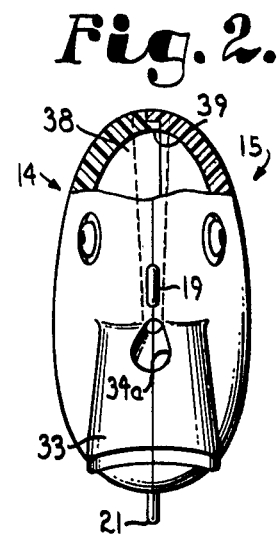
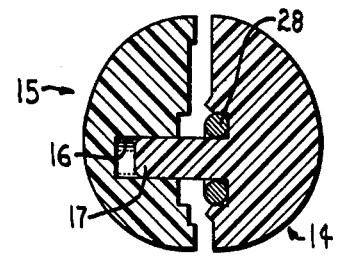
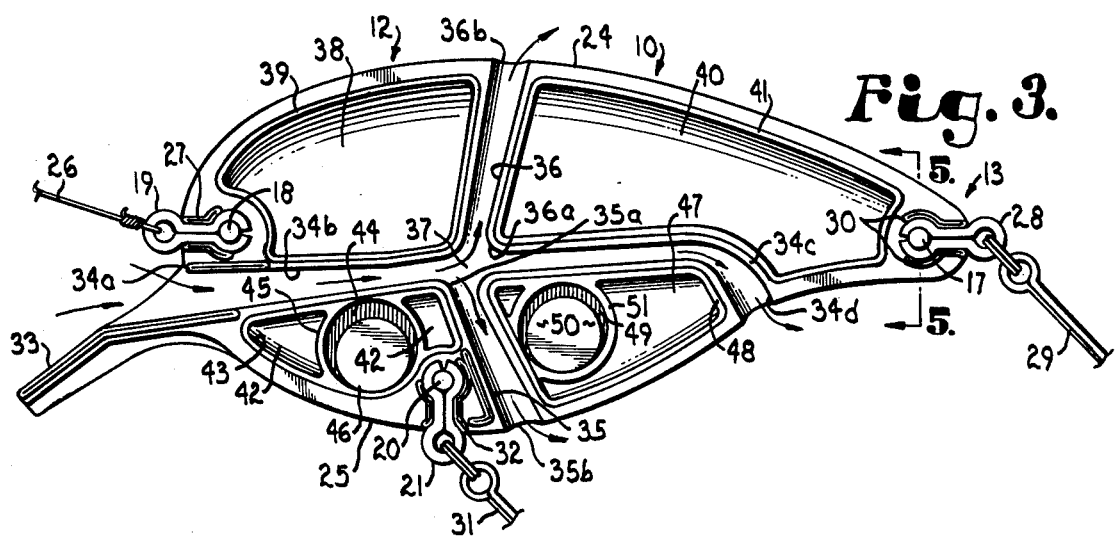
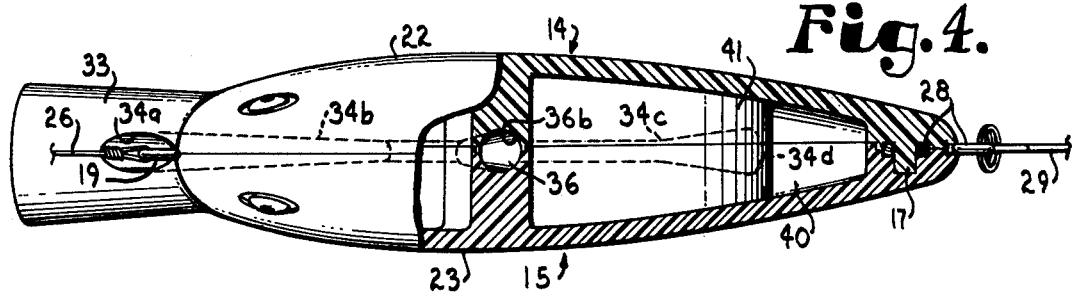
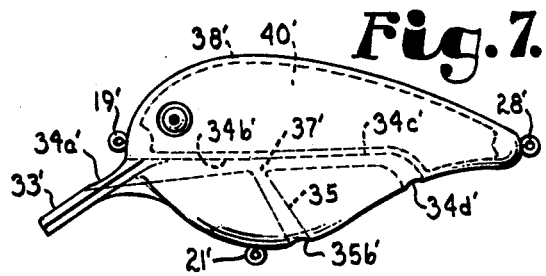

WATER FLOW THROUGH FISHING LURE

BACKGROUND OF THE INVENTION

Fishing lures are known which flow water through the lure. These lures apparently attract fish and, in some applications, at least, are more successful than lures not having water passages therethrough.

As a specific example of such prior art lures, reference is made to the lures of Aquasonic Lures, Inc., Post Office Box 118, Cibolo, Tex. 78108, disclosed in their brochure "The Hole Idea". In this brochure is a reprint of an article from Bassmaster Magazine "Space Age Bass Bait", by Dave Ellison.

The theory of operation of this type of lure is to create a different sound in the water (from that of conventional lures) when the lure is pulled through the water by the fisherman. Thus, all swimming lures of whatever size or configuration cause vibrations in the water because of their motions through the water during retrieve. By flowing water through chambers or passages in the lure during retrieve, different sounds and vibrations are created as the water enters and exits the bait into and from the various openings.

OBJECTS OF THE INVENTION

A first object of the invention is to provide improved fishing lures which pass water through the body of the bait in order to create a unique sound and vibrations different from conventional lures in the water during retrieve of the lure.

Another object of the invention is to provide improved fishing lures which pass water through the body of the lure of both the sinking and non-sinking types.

Another object of the invention is to provide improved fishing lures of the type described where the water intake at the front of the lure body is optimally positioned with respect to the fishing line eyelet connection and a bill on the bait.

Another object of the invention is to provide improved fishing lures of the type described which have water passages, flotation chambers, eyelets for line and hooks and weight chambers all arranged so as to produce an optimum such bait and lure.

Another object of the invention is to provide improved noise making fishing lures having a multiplicity of flotation chambers therewithin, the lower flotation chambers having non-sealed weight received chambers therewithin, such serving to orient the bait or lure in the water.

Other and further objects of the invention will appear in the course of the following description thereof.

In the drawings, which form a part of the instant specification and are to be read in conjunction therewith, embodiments of the invention are shown and, in the various use like numerals are employed to indicate like parts.

FIG. 1 is a three-quarter perspective use from above of the improved lure in actual use.

FIG. 2 is an enlarged, frontal view of the lure of FIG. 1, with the upper portion thereof cut away to better illustrate the construction.

FIG. 3 is a side view of one half of the lure of FIGS. 1 and 2 prior to assembly of and fusion thereof with a like, but opposite half.

FIG. 4 is a top plan view of the lure of the previous Figures with portions thereof cut away to better illustrate the internal construction of the lure.

FIG. 5 is a view taken along the line 5—5 of FIG. 3 in the direction of the arrows.

FIG. 6 is an enlarged, fragmentary section of the upper central portion of the lure of FIGS. 1-5, inclusive prior to joining together of the halves of the lure by ultrasonic welding.

FIG. 7 is a side elevation of the modified form of lure differing from the structure of FIGS. 1-6, inclusive in that the lure has only two water discharging passageways therewithin and but a single upper flotation chamber.

STRUCTURE AND FUNCTION

The bait construction of FIGS. 1-6, inclusive, being the preferred form, will be first described. Hereinafter the terms bait or lure will be used interchangeably.

The bait, as illustrated, comprises an elongate body, generally designated 10, which is substantially oval in both side and plan views. There is a relatively short, blunt front end, generally designated 11, which typically rounds rearwardly to an enlarged mid-portion, generally designated 12, thereafter, the body tapering rearedly towards a relatively narrow rear end generally designated 13. The body, including the bill at the forward end thereof, is generally (and most conveniently) fabricated in two parts which are thereafter either glued, ultrasonically welded or otherwise conventionally attached to one another. Particularly referring to FIGS. 2, 4 and 5, this particular construction has a first body half generally designated 14, the other body half being generally designated 15. The half of the body seen in FIG. 3 is half 14.

Since the manner, means and mode of connecting two bait body halves together (such as by glueing, ultrasonically welding or the like) is conventional, the bait itself will be described as an integral unit. Typically, however, in addition to the glueing or welding fusion along the portions of the body to be described, there is provided, at the forward and rearward ends of the bait, and optionally in the lower portion thereof, a male-female connection as detailed in FIGS. 3-5, inclusive for the rearmost end of the bait. This type of connection, involving a female passage 16 and a male member 17 in halves 15 and 14, respectively, operates to additionally secure the halves together and make sure the alignment of all the parts thereof is precise. Such a connection is preferably provided at each of the eyelet mounting posts 18 (front eyelet 19) and 20 (bottom eyelet 21). The sockets to receive posts 18 and 20 are not seen in the views but are the same or similar to socket 16 in FIGS. 4 and 5.

The body has lateral, opposed sides 22 and 23, as well as top side 24 and bottom or underside 25.

First eyelet 19 is mounted on post 18 at the front end 11 of the body for connection to a fishing line 26. Double eyelet 19 is rigidly positioned in the front end 11 of body 10 by locating means 27. A second eyelet 28, also FIG. 8 in configuration, is mounted by one end on post 17 at the rear end 13 of the body, operative to carry hook or gang hook 29 attached thereto. Rigid securing means 30 fix eyelet 28 from motion with respect to the body. A third eyelet 21 is mounted in the underside of the body forward of the center thereof (somewhat) on post 20 and carries hook or gang hook 31 thereon. Securing means 32 in the lower central portion of body 10 secure eyelet 21 against motion with respect thereto.

A bill 33 is connected to or integral with the front end of the body. It is positioned below and spaced away from the first eyelet body connection and post 18. Bill 33 angles somewhat downwardly from its connection to the body, with respect to the longitudinal axis of the body. Bill 33 comprises two half portions, one on each body segment, which are ultrasonically bonded together when the body segments are fused together.

For purposes of description and explanation, the interior parts of the bait body will be described as if they were hollowed out of a solid piece. These parts include the water passages to be described, four flotation chambers and two nonsealed weight receiving chambers, as well as the weights received therewithin. However, in practice or fabrication, typically, the sides of the bait body are molded plastic pieces preformed to be mating halves, the precise positioning of the halves located by the post-socket connections previously mentioned, with the peripheral and interior portions of the body which are to be fused together by glueing, ultrasonically welding, etc. adapted to meet for fusion when the two halves are brought together in the fabrication process.

A first passage is provided in the body having an entry port 34a in the base of bill 33 below the first eyelet 19 connection to the front end of the body. This passage, from the enlarged port and inlet 34a tapers rearwardly as at 34b, running substantially axially rearwardly in the body past the mid-portion thereof and then turning downwardly at 34c, somewhat enlarging, to pass out of the body through port 34d intermediate the rear end 13 of the body and the mid-portion 12 thereof. This passage (34) is centrally located in the body, as may particularly be seen in FIG. 4.

A second passage generally designated 35 connects at its inward end 35a to the first passage 34 substantially midway of the ends thereof and passes downwardly in the bait, exiting at port 35b from the bottom side of the bait. Passage 35 is positioned immediately rearwardly of the third eyelet 21 connection to the bait body. The port 35b is positioned well forward of the exit port 34d of first passage 34. Preferably, passage 35 tapers from a smaller cross sectional area adjacent the connection to passage 34 to a larger cross-sectional area at its exit port 35b.

A third passageway or passage 36 connects at its inward end to the first passageway essentially opposite the intake to passage 35 at its inward end 36a and exits essentially centrally of the upper wall 24 of body 10 through port 36b. Again, passage 36 tapers from a relatively throttled zone at 36a to a relatively open zone at 36b (preferably).

The juncture of passages 34, 35 and 36 is at a central chamber 37. Preferably, passages 35 and 36 slant somewhat rearwardly in the bait. Additionally, preferably, passage 36 is positioned slightly rearwardly in the bait of passage 35.

A first, upper, forward, sealed air chamber 38 is defined in the bait body by the side walls of the two halves of the body and continuous wall 39. This chamber is positioned above passage 34 and forward of passage 36, running aft from the eyelet 19 connection post 18.

A second, upper, rearward, sealed air chamber 40 is additionally provided in the bait body defined by the side walls thereof and continuous wall 41 therearound, this chamber being aft of passage 36, above the rearward portion of passage 34, running aft substantially to the rear eyelet 28 post connection 17, as particularly seen in FIG. 3.

A third, forward, lower, sealed air chamber 42 is provided in the front lower portion of the bait, defined by the side walls of the bait body halves and circumferential, sealed wall 43 therearound. Positioned within chamber 42 is a non-sealed, weight receiving chamber 44, defined by circumferential wall 45 and receiving weight 46 therewithin, loosely, so as to rattle therewithin. In the halves of the bait, the circumferential wall portion 45 defining chamber 44 does not either meet or fuse with the like wall in the opposite body half element. Accordingly, the air in chamber 42 interpenetrates the chamber 44. Chamber 42 is sealed circumferentially, however, at wall 43.

The lower, rearward inner chamber 47 is defined by circumferential wall 48, also sealed, the chamber enclosed by the side walls of the bait and circumferential wall 48. This chamber is rearward of passage 35, forward of the passage 34 exit port 34d and under the rearward portion of passage 34. A second weight chamber 49, containing weight 50, is defined by walls 51 (in both bait body halves) which do not fuse to one another or quite meet when the bait body halves are glued or fused together. Weight 50 is also a rattler weight of lesser outer diameter than the interior diameter of chamber 49. Air in chamber 47 interpenetrates chamber 49.

ASSEMBLY AND FUNCTION
(FIGS. 1–6, INCLUSIVE)

In assembly of the device of FIGS. 1–6, inclusive, it assumed that the structure is as described. There are three sockets formed in half 15 of the bait body to receive, in matching fit, the posts 17, 20 and 18, whereby to precisely position the halves with respect to one another for glueing, welding or otherwise fixedly and sealingly attaching same to one another. Before mating the halves, the eyelets 28, 21 and 19 are mounted on their respective posts 17, 20 and 18 and weights 46 and 50 placed in chambers 44 and 49. Thus, the eyelets and weights are placed in, preferably, bait body half 14, before connecting the body halves one to the other.

Glue then may be applied along the lines of fusion, assuming glueing is used, and the halves mated. Alternatively, the halves are mated and ultrasonically welded, one to the other. The hook assemblies may be attached before fusion or thereafter. The line is, of course, attached by the fisherman in use.

Once the device is sealed or fused to the structure seen in the FIGS. 1 and 2–4, inclusive, the following is true. The conduits 34, 35 and 36 are sealed along their length so as to provide a watertight flow-through channel system. Each of the flotation chambers 38, 40, 42 and 47 is sealed circumferentially so as to be air tight. The weight chambers 44 and 49, defined by alls 51 and 45, are not sealed in the air chambers.

The size of the weight chambers 44 and 49 and the actual weight of the weights 46 and 50 employed therewithin depends on the degree of buoyancy desired (sinking or non-sinking bait). Alternatively, in a sinking bait, the chambers 38, 40, 42 and 47, or any of them, may be of lesser volume. In the case of a non-sinking bait, the presence of the weights 46 and 50 and eyelet 21 and hook 31 orient the bait in proper bottom downward position. This is also true for the sinking lure.

In use, the fisherman attaches line 26 to the forward portion of eyelet 19. When the bait is cast by the fisherman, once it strikes the water, it either floats or sinks, depending upon its sinking or non-sinking character. As the fisherman retrieves the bait, water flows inwardly through passage 34, exiting from one, two or all of the passages 34, 35 and 36, giving the desired sound pattern and noises which attract the fish. By the placing the eyelet 19 immediately above the opening 34a of passage 34 and port 34a at the base of the bill, the optimum water injection is provided in the bait, with the line 26 tending to pull the bait front end up, with the bill, under water, tending to submerge the bait.

FIG. 7

The construction of FIG. 7 differs from that of the bait body of FIGS. 1–6, inclusive only in that:

(1) The upper passage 36 and the wall in which it is received (which divides chambers 38 and 40 from one another) is removed; and (2) Because of the removal of the wall carrying passage 36, there is but a single flotation chamber in the upper portion of the bait, specifically, a fusion of chambers 38 and 40 seen in FIG. 3 and FIG. 4.

Since, otherwise, all the parts of the bait are identical, like parts are numbered the same as in FIG. 1–6, inclusive, but primed.

The assembly and use of the bait of FIG. 7 is the same as that of the bait body of FIGS. 1–6, inclusive.

ADDITIONAL COMMENTS

The purpose of positioning the weight chambers 44 and 49 in the lower portion of the bait is to normally position the bait in the water with its lower side down. The provision of two separate weight chambers 44 and 49 on each side of the lower hook attachment 21 and passage 35 is for symmetrical balance in the water of the bait. It is additionally feasible to shorten the bill 33 to an extension no further than the lower edge of the intake opening. In the case of a sinking bait, the bill length would be minimized, the bait body made slimmer (less buoyancy space) and the lower hook attachment 21 (preferably) removed.

In use of the bait, when it is cast by fisherman, the passages are freed of or become free of water and the air, which fills the passages, at least during the flight of the bait, is bubbled or gurgled off in the passage of the bait through the water as it is drawn in by the fisherman. The major quantity of the water passed through the bait actually passes through the in line channels 34b and 34c in the main stream. Preferably, the distance between the hook attachments 21 and 28, with respect to the normal length of the hooks 29 and 31, is such that the hooks will not interlock in handling, casting or use.

A diving bait is one wherein, after the bait is cast, the bait body floats. As the fisherman retrieves the bait by reeling in the line, the bait is pulled under the water. The presence of the bill 33 facilitates this action. The longer the bill, the less angle with the body is required.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A noise-making fishing lure comprising, in combination, an elongate body, substantially oval in each of side and plan views, with a relatively short, blunt front end rounding rearwardly to an enlarged mid-portion and thereafter tapering rearwardly therefrom to a relatively narrower rear end, the body having lateral, opposed sides and top and bottom sides, a first eyelet attached to the front end of the body for connection to a fishing line, a second eyelet attached to the rear end of the body for carrying a hook, a third eyelet attached to the underside of the body for carrying a hook, a bill connected to the front end of the body below and spaced away from the first eyelet body connection, said bill angling somewhat downwardly from its connection to the body, with respect to the longitudinal axis of the body, a first passage in said body entering the front end at the base of the bill and below the said first eyelet connection, running substantially axially rearwardly of the body past the mid-portion thereof, then turning downwardly and exiting out of the underside of the body ahead of the second eyelet connection, but well aft of the third eyelet connection, a second passage connecting at its inward end to the first passage substantially midway of the ends thereof, passing downwardly in the body substantially immediately rearwardly of the third eyelet connection and exiting from the bottom side of the body well forward of the exit of the said first passage therefrom, a first sealed air chamber in said body above said first passage running substantially from aft of the first eyelet connection to forward of the second eyelet connection, a second sealed air chamber in said body under the front end of the first passage and forward of the said second passage, a third sealed air chamber in said body under rear end of the first passage and aft of the second passage, and non-air sealed chambers contained within said second and third chambers, each receiving a weight therewithin.

2. A lure as in claim 1 wherein the weights received in said non-air sealed chambers are sufficient to vertically orient the body, but insufficient to sink the body when it is lying in the water.

3. A lure as in claim 1 wherein the weight contained in said non-air sealed chambers is sufficient both to vertically orient the body with the bottom side down in the water and, additionally, sink the body when it is lying in the water.

4. A lure as in claim 1 including a transverse wall in the upper portion of said body dividing the first sealed air chamber above said first passage into a first upper forward air chamber and a first upper rearward air chamber, there being a third passage in said wall connecting at its inward end to the first passage substantially midway of the ends thereof, passing upwardly in the body substantially opposite the said second passage and exiting from the top side of the body.

5. A lure as in claim 4 wherein the first passageway has enlarged intake and exit ends and each of the second and third passageways tapers from a relatively restricted intake throat to a larger area output end.

6. A lure as in claim 1 wherein the intake and exit ends of the first passage are of greater cross-sectional area than the rest of said passageway.

7. A lure as in claim 6 wherein the second passage tapers from lesser area input end to a greater area output end.

8. A noise-making fishing lure comprising, in combination,
   an elongate body, substantially oval in each of side and plan views, with a relatively short, blunt front end rounding rearwardly to an enlarged mid-portion and thereafter tapering rearwardly therefrom to a relatively narrower rear end,
   the body having lateral, opposed sides and top and bottom sides,
   a first eyelet attached to the front end of the body for connection to a fishing line,
   a second eyelet attached to the rear end of the body for carrying a hook,
   a short bill connected to the front end of the body below and spaced away from the first eyelet body connection, said bill angling somewhat downwardly from its connection to the body, with respect to the longitudinal axis of the body,
   a first passage in said body entering the front end at the base of the bill and below the first eyelet connection running substantially axially rearwardly of the body past the mid-portion thereof, then turning downwardly and exiting out of the underside of the body ahead of the second eyelet connection, but well aft of the central portion of the body,
   a second passage connecting at its inward end to the first passage substantially midway of the ends thereof, passing downwardly in the body substantially midway between the front end thereof and the exit opening of the first passageway and exiting from the bottom side of the body well forward of the exit of the said first passage therefrom,
   a first sealed air chamber in said body above said first passage running substantially from aft of the first eyelet connection to forward of the second eyelet connection,
   a second sealed air chamber in said body under the front end of the first passage and forward of the second said passage,
   a third sealed air chamber in said body under the rear end of the first passage and aft of the second passage, and
   non-air sealed chambers contained within said second and third chambers, each receiving a weight therewithin.

9. A lure as in claim 8 wherein weights received in said non-air sealed chambers are sufficient to both vertically orient the body with the bottom side down in the water and, additionally, sink the body when it is lying in the water.

10. A lure as in claim 8 including a transverse wall in the upper portion of said body dividing the first sealed air chamber above said first passage into a first upper forward air chamber and a first upper rearward air chamber, there being a third passage in said wall connecting at its inward end to the first passage substantially midway of the ends thereof, passing upwardly in the body substantially opposite the said second passage and exiting from the top side of the body.

* * * * *